(12) United States Patent
Davey (10) Patent No.: US 10,341,606 B2
(45) Date of Patent: Jul. 2, 2019

(54) SYSTEMS AND METHOD OF TRANSMITTING INFORMATION FROM MONOCHROME SENSORS

(71) Applicant: SA Photonics, Inc., Los Gatos, CA (US)

(72) Inventor: James Arundell Davey, Sunnyvale, CA (US)

(73) Assignee: SA Photonics, Inc., Los Gatos, CA (US)

( * ) Notice: Subject to any disclaimer, the term of this patent is extended or adjusted under 35 U.S.C. 154(b) by 0 days.

(21) Appl. No.: 15/604,475

(22) Filed: May 24, 2017

(65) Prior Publication Data

US 2018/0343417 A1 Nov. 29, 2018

(51) Int. Cl.
| | |
|---|---|
| *H04N 7/08* | (2006.01) |
| *H04N 5/073* | (2006.01) |
| *H04N 7/10* | (2006.01) |
| *H04N 5/04* | (2006.01) |
| *H04N 5/247* | (2006.01) |
| *H04N 7/18* | (2006.01) |

(52) U.S. Cl.
CPC .............. *H04N 7/0806* (2013.01); *H04N 5/04* (2013.01); *H04N 5/0733* (2013.01); *H04N 5/247* (2013.01); *H04N 7/10* (2013.01); *H04N 7/181* (2013.01)

(58) Field of Classification Search
CPC ...... H04N 7/10; H04N 7/0806; H04N 5/0733; H04N 5/04; H04N 5/247; H04N 7/181
USPC ....... 348/659, 658, 661, 680, 693, 719, 723, 348/725, 756, 488, 441, 423.1, 343, 263, 348/260, 259, 237, 227.1, 211.5, 207.2, 348/207.1, 164, 159, 153, 141, 135, 73, 348/64, 54, 53, 52, 50, 49, 48, 47, 33; 345/6, 7, 8, 419; 359/356, 630, 815, 880
See application file for complete search history.

(56) References Cited

U.S. PATENT DOCUMENTS

| | | | | |
|---|---|---|---|---|
| 2,677,720 A | * | 5/1954 | Bedford | H04N 11/12 348/494 |
| 4,599,640 A | * | 7/1986 | Dischert | H04N 9/045 348/265 |
| 4,809,061 A | * | 2/1989 | Suzuki | H04N 1/40056 348/265 |
| 5,013,474 A | * | 5/1991 | Arai | C09K 19/60 252/299.1 |
| 5,398,066 A | * | 3/1995 | Martinez-Uriegas | H04N 9/8047 375/240.25 |
| 5,654,758 A | | 8/1997 | Taylor et al. | |
| 5,724,475 A | | 5/1998 | Kirsten | |

(Continued)

FOREIGN PATENT DOCUMENTS

| | | |
|---|---|---|
| CN | 106454101 | 2/2017 |
| JP | 2003-309759 | 10/2003 |

(Continued)

*Primary Examiner* — Michael Lee
(74) *Attorney, Agent, or Firm* — Knobbe, Martens, Olson & Bear, LLP (57) ABSTRACT

Systems and methods of multiplexing information from a plurality of monochrome sensors/cameras is provided. The systems and methods provided can be useful to achieve pixel-level time synchronization between information acquired by different monochrome sensors/cameras that are configured to view a scene from different viewing directions.

25 Claims, 3 Drawing Sheets

(56) References Cited

U.S. PATENT DOCUMENTS

| | | | |
|---|---|---|---|
| 6,278,492 B1* | 8/2001 | Nakamura | H04N 5/232 |
| | | | 348/262 |
| 6,768,508 B1 | 7/2004 | Broemmelslek et al. | |
| 7,733,369 B2 | 6/2010 | Yin et al. | |
| 9,618,746 B2 | 4/2017 | Browne | |
| 2002/0097863 A1* | 7/2002 | Rahamim | H04L 27/0002 |
| | | | 379/399.01 |
| 2003/0035056 A1* | 2/2003 | Chen | H04N 1/40012 |
| | | | 348/273 |
| 2003/0122958 A1* | 7/2003 | Olita | A42B 3/042 |
| | | | 348/373 |
| 2003/0169338 A1 | 9/2003 | Bergen et al. | |
| 2005/0063707 A1* | 3/2005 | Imai | H04L 25/14 |
| | | | 398/141 |
| 2005/0140786 A1* | 6/2005 | Kaplinsky | H04N 5/23203 |
| | | | 348/207.1 |
| 2007/0201740 A1* | 8/2007 | Kuwata | G06T 11/60 |
| | | | 382/162 |
| 2008/0208006 A1* | 8/2008 | Farr | A61B 1/0607 |
| | | | 600/178 |
| 2009/0040309 A1* | 2/2009 | Ishii | G08B 13/19645 |
| | | | 348/159 |
| 2009/0214079 A1* | 8/2009 | Hamza | G06K 9/00798 |
| | | | 382/103 |
| 2009/0278931 A1 | 11/2009 | Lee et al. | |
| 2011/0157451 A1 | 6/2011 | Chang | |
| 2013/0106674 A1* | 5/2013 | Wheeler | G02B 27/017 |
| | | | 345/8 |
| 2013/0208153 A1* | 8/2013 | Takano | H04N 9/045 |
| | | | 348/265 |
| 2016/0057406 A1* | 2/2016 | Perriollat | G01B 11/245 |
| | | | 348/48 |
| 2017/0135608 A1* | 5/2017 | Pappe | A61B 5/743 |

FOREIGN PATENT DOCUMENTS

| | | |
|---|---|---|
| KR | 10-1258050 | 4/2013 |
| TW | M525032 | 7/2016 |

* cited by examiner

SYSTEMS AND METHOD OF TRANSMITTING INFORMATION FROM MONOCHROME SENSORS

STATEMENT REGARDING FEDERALLY SPONSORED R&D

This invention was made with government support under SBIR Phase II U.S. Government contract N68335-12-C-0185 awarded by the United States Navy. The government may have certain rights in the invention.

BACKGROUND

Field

This application generally relates to the field of data transmission and synchronized video transmission in particular.

Description of the Related Technology

An imaging system comprising a plurality of cameras or sensors (or sensor arrays) that image a scene from different perspectives or directions can be useful to increase the field of view of the systems and/or to provide three dimensional view. Individual cables are used to transmit information from the sensors to a video processing system that can generate an image for display from the images acquired by the plurality of cameras or sensors. The use of individual cables to transfer data from the plurality of cameras to the video processing system may cause the data streams from the different cameras or sensors to be unsynchronized in time. Furthermore, use of individual cables to transfer data from the plurality of cameras/sensors to the video processing system may increase cable bulk.

SUMMARY

The systems and methods discussed herein are directed towards multiplexing the data from the different monochrome cameras or sensor arrays in to a single data stream such that the data from the different cameras/sensor arrays is time synchronized. The systems and methods discussed herein can reduce complexity of video processing. Additionally, the systems and methods discussed herein can reduce cable bulk. For example, when the different monochrome cameras or sensor arrays are disposed in a helmet, multiplexing the data from the different monochrome cameras or sensor arrays and transmitting the multiplexed data using a single cable can advantageously reduce the number of cables that are attached to the helmet.

The systems and methods described herein can be configured to multiplex data from a plurality of monochrome cameras/sensors and transmit the multiplexed data along a cable (e.g., a coaxial cable and/or a balanced pair) that is configured to transmit multiplexed color data (e.g., red (R), green (G) and/or blue (B) color data) from a color camera/sensor. Using a cable that is otherwise capable of and/or configured to transmit multiplexed color data (e.g., red (R), green (G) and/or blue (B) color data) from a color camera/sensor to instead transmit multiplexed time synchronized data from a plurality of monochrome cameras/sensors can provide several advantages including but not limited to cost savings, reduction in image processing complexity, reduction in cable bulk and/or reducing the need to modify wirings of environments in which the imaging system is used. The systems and methods described herein can be disposed in military vehicles, helmets, aircraft, watercraft, etc. The systems and methods described herein can be disposed in, for example, ships (e.g., aircraft carriers), boats, submarines, airplanes, helicopters, etc. The systems and methods described herein can be useful for military applications, homeland security applications, surveillance, defense and security applications, etc. The systems and methods described herein can be advantageous in real-time or near real-time two-dimensional (2D) or three-dimensional (3D) imaging of a scene.

Accordingly, one innovative aspect of the embodiments discussed herein comprises an imaging system comprising a plurality of cameras. The plurality of cameras comprises a plurality of optical sensor arrays. Different sensor arrays of the plurality of optical sensor arrays are configured to obtain a monochrome image of a scene and produce image data. The imaging system further comprises a multiplexing unit configured to multiplex image data obtained by different sensor arrays of the plurality of optical sensor arrays and generate a single image stream. The imaging system further comprises a transmission line configured to accept the generated single image stream. In various implementations, the transmission line can be a coaxial cable. In some implementations, the transmission line can be a balanced pair. In some implementations, the transmission line can be configured to accept image data obtained by a RGB color camera comprising a pixel array comprising red, green, and blue sub-pixels configured to detect light in red, green and blue wavelengths, respectively, of the visible spectral range. For example, the transmission line can be a cable that is typically used to transfer image data from a color camera (e.g., a RGB camera).

In some implementations, the plurality of optical sensor arrays can comprise three optical sensor arrays. Each of the three optical sensor arrays can comprise an array of pixels, each pixel in the array of pixels can be associated with a unique set of coordinates designating the position of the pixel. The multiplexing unit can be configured to time division multiplex image data obtained by the three optical sensor arrays as a single serial image stream comprising a plurality of multiplexed pixels. The plurality of multiplexed pixels can comprise information associated with a pixel from the optical sensor arrays associated with the three optical sensor arrays.

Various implementations of the imaging system can further comprise an image processing unit in communication with the transmission line. The image processing unit can be configured to generate time synchronized images from the images acquired by the plurality of cameras that can be displayed on one or more display devices. In various implementations, the plurality of optical sensor arrays can comprise monochrome sensor arrays. The plurality of optical sensor arrays can comprise sensor arrays sensitive to light in a wavelength range between about 360 nm and about 12 microns. The plurality of optical sensor arrays can comprise infrared sensor arrays sensitive to infrared light. The plurality of cameras can comprise night vision cameras. The plurality of cameras can further comprise a lens configured to image the scene. The plurality of cameras can have different fields of view. Various implementations of the imaging system can be disposed in an aircraft, a ship, a boat or a terrestrial vehicle. Various implementations of the imaging system can be disposed on a helmet configured to be worn on the head of a wearer. Various implementations of the imaging system can further comprise an image processing unit to generate time synchronized images from the images acquired by the plurality of cameras that can be displayed on one or more display devices disposed in front of the wearer's left and right eyes. In various implementations, the display devices can be disposed on the helmet. In various implementations, the cameras can be disposed on the helmet.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Example implementations disclosed herein are illustrated in the accompanying schematic drawings, which are for illustrative purposes only.

DETAILED DESCRIPTION OF EMBODIMENTS

Figure 1:
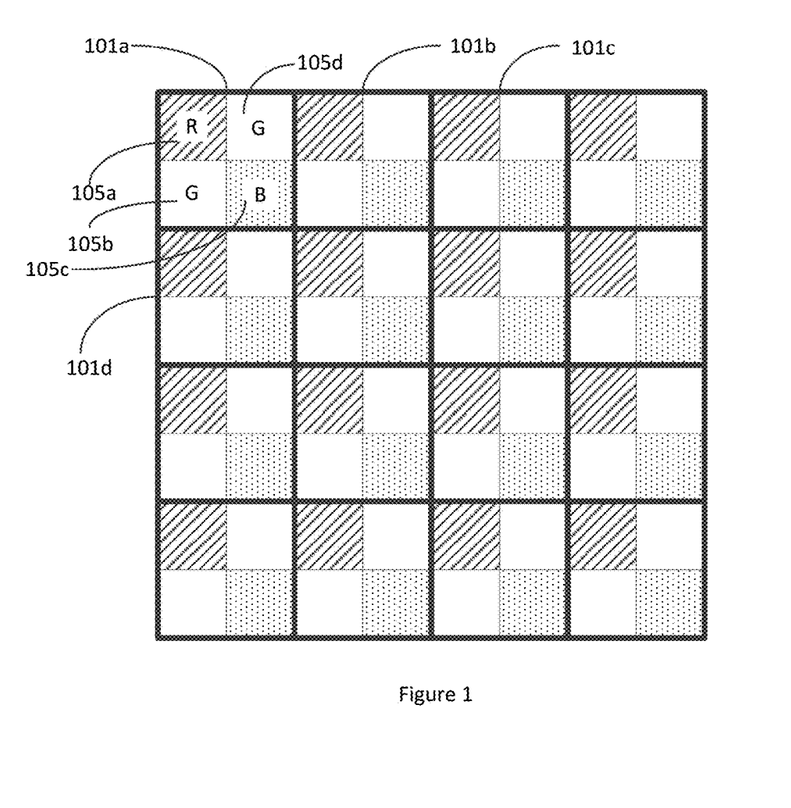
FIG. 1 is a schematic illustration of an arrangement of a plurality of red (R), green (G) and blue (B) sensors in an RGB sensor array or focal plane array (FPA).

Conventional color cameras (e.g., video cameras, digital cameras, etc.) may comprise a sensor or detector array (e.g., a charge-coupled device (CCD) or a CMOS sensor array) comprising a plurality of pixels and a lens configured to image objects onto the sensor array. Each pixel of the optical sensor array may comprise subpixels for sensing different color light such as red light, green light, and blue light. FIG. 1 schematically illustrates a sensor array that is sensitive to red, green and blue light that can be used in conventional color cameras. The optical sensor array comprises a plurality of pixels, such as, for example, pixels 101a, 101b, 101c and 101d. The plurality of pixels comprises sub-pixels, such as, for example, 105a, 105b, 105c and 105d that are configured to be sensitive to red, green and blue light. The signal from respective ones of the plurality of pixels are associated with the intensity of red, green and blue light of a corresponding portion of an object/scene that is imaged on the respective ones of the plurality of pixels. Data from the sensor array can be processed and output to a display device, a storage device, or other types of devices, such as a printer, a projector, etc., via a cable and/or transmission lines. Data from the sensor array can be packaged, for example, multiplexed, in a variety of ways. For example, in some implementations, the signal from the sub-pixels can be separated into different color channels. The different color channels may be outputted at separate time intervals. As another example, in some implementations, each of the plurality of pixels comprising red, green and blue sub-pixels may be sequentially outputted. As yet another example, all the pixels in a single row or a single column may be multiplexed together before being output. A single transmission line or cable can thus transmit data from a color (RGB) camera.

In some cases, monochrome sensor arrays an provide higher resolution and sensitivity as compared to color cameras. Monochrome sensor arrays can also be configured as night vision cameras. Monochrome sensor arrays can be attractive for capturing monochrome, e.g., black and white, images/videos, for example, for various military applications, homeland security applications, surveillance, defense and security applications, etc. In various implementations, the monochrome sensor arrays may comprise infrared sensor arrays or cameras. These sensor arrays or cameras may be night vision cameras that are sensitive to low light levels and thus can produce images even with little light such as provided in low ambient light conditions. The monochrome sensor arrays may be configured to receive light in a wide wavelength range between about 360 nm and about 12 microns. For example, the monochrome sensor arrays may be configured to receive and detect light in the visible spectral range, the infrared spectral range, or both. As another example, the monochrome sensor arrays may be configured to receive and detect light in a wavelength range between about 750 nm and about 12 microns, such as, for example, between about 800 nm and about 12 microns, between about 900 nm and about 12 microns, between about 1.3 microns and about 12 microns, between about 1.5 microns and about 12 microns, between about 900 nm and about 3 microns, between about 1 micron and about 3 microns, or any value in any of the ranges/sub-ranges defined by these values.

Figure 2:
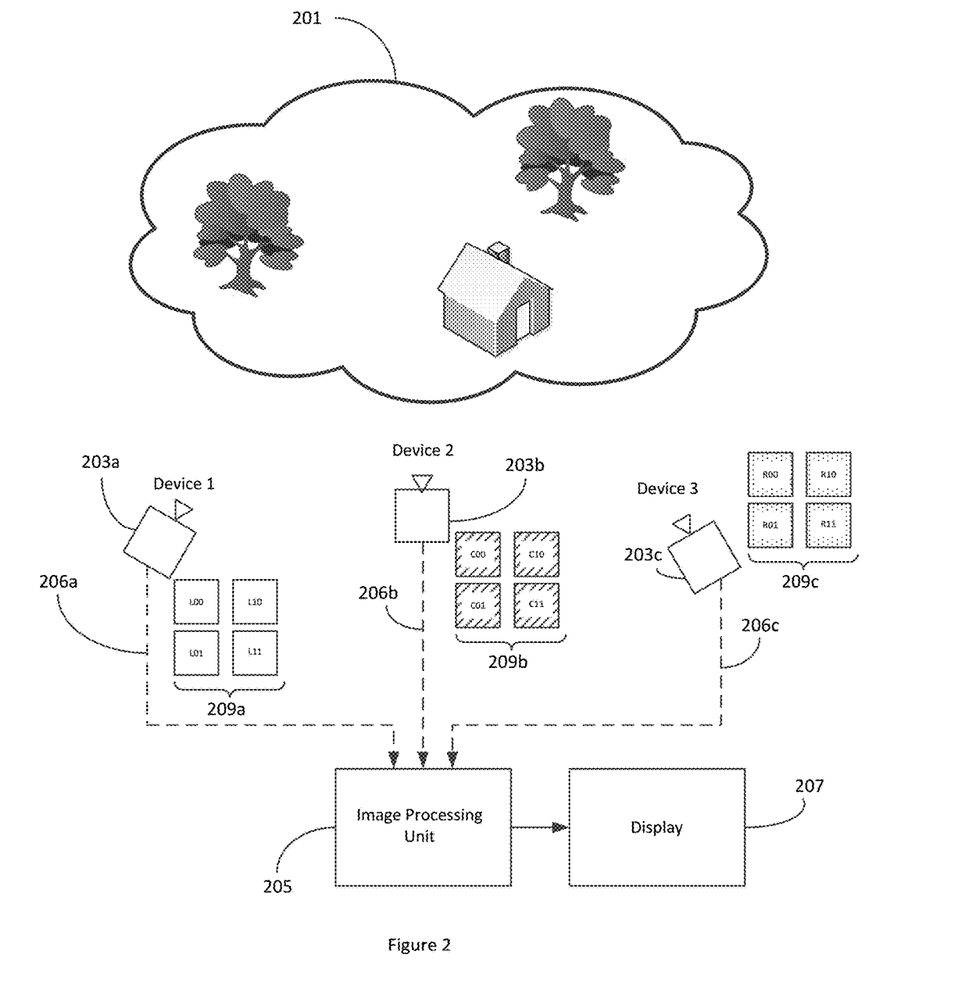
FIGS. 2 and 3A schematically illustrate a plurality of monochrome cameras, for example, comprising a plurality of monochrome sensor arrays or monochrome focal plane arrays imaging a scene.

FIG. 2 schematically illustrates an imaging system comprising three monochrome imaging devices (e.g., monochrome cameras or monochrome sensor arrays with imaging optics such as one or more imaging lenses) 203a, 203b and 203c that are configured to image a scene 201 from different viewing directions. The imaging system further comprises an image processing unit 205 that is configured to process the image data acquired by the different imaging devices and generate a two-dimensional or a three-dimensional view of the scene that can be displayed on a display device 207. For example, in some implementations, the image processing unit 205 can be configured to stitch together the image data acquired by different of the imaging devices to generate a wide-field-of-view image.

In the implementation illustrated in FIG. 2 individual cables/transmission lines are used to transmit data from the different imaging devices. For example, cable 206a is used to transmit information from the sensor array 209a that corresponds to the image data acquired by the imaging device 203a, cable 206b is used to transmit information from the sensor array 209b that corresponds to the image data acquired by the imaging device 203b and cable 206c is used to transmit information from the sensor array 209c that corresponds to the image data acquired by the imaging device 203c. Depending on the application, the cables 206a, 206b and 206c can have a length between about 1 inch and about 100 feet or possibly more. For example, if the imaging system is implemented in a helmet, then the cables 206a, 206b and 206c can have a length between about 1 inch and about 6 inches or 10 inches or 12 inches. As another example, if the imaging system is implemented in an aircraft or a ship, then the cables 206a, 206b, and 206c can have a length between about 10 feet and about 100 feet. As yet another example, the cables 206a, 206b, and 206c can be about 100's of feet long. For example, the cables 206a, 206b, and 206c, can be between 100 to 300 feet, 100 to 500 feet, 100 to 1000 feet or more.

When the imaging devices are imaging the same scene, time synchronization between the image data acquired by the different imaging devices may can be beneficial. However, in the implementation of the imaging system depicted in FIG. 1, the image data acquired by the different imaging devices may not be time synchronized when received by the image processing unit 205. Accordingly, the image processing unit 205 may have additional processing capabilities to synchronize the image data acquired by the different imaging devices. In some cases, synchronizing the image data acquired by the different imaging devices at the image processing unit 205 may increase latency of the imaging system. Reduced latency can be beneficial for real-time or near real-time display of the acquired images. Thus, in some cases, it may be advantageous if the data acquired by the different imaging devices is time synchronized before being received by the image processing unit.

It may be desirable to provide a plurality of monochrome imaging devices (e.g., sensors/cameras) that are configured to image a scene from different viewing directions in various environments. Such environments may include, for example, military vehicles, aircrafts, ships or boats or military installations. Many of the environments may have or otherwise already be equipped or designed to accommodate a single camera (e.g., color camera) that acquires a color image of a scene and transmits the acquired color image via a single cable/transmission line to an image processing unit. The single cable/transmission line may be a cable that is configured to transmit image data from a color camera to a display a storage device, and/or other device. The transmission line may comprise, for example, a coaxial cable. In some implementations, the transmission line may comprise a balanced pair. In such environments, when the monochrome imaging devices are provided instead of or in addition to the single camera, it may be advantageous to time synchronize the information from the monochrome imaging devices and transmit them via the single cable/transmission line to the image processing unit instead of rewiring the environment to install individual cables from the various monochrome imaging devices to the image processing unit.

Thus, multiplexing the image data from the plurality of monochrome imaging devices and transmitting the multiplexed data via a single cable/transmission line can have several advantages including but not limited to reducing cable bulk, and/or reducing the need to rewire environments. Such an approach may also reduce latency in some cases.

Figures 3A, 3B:
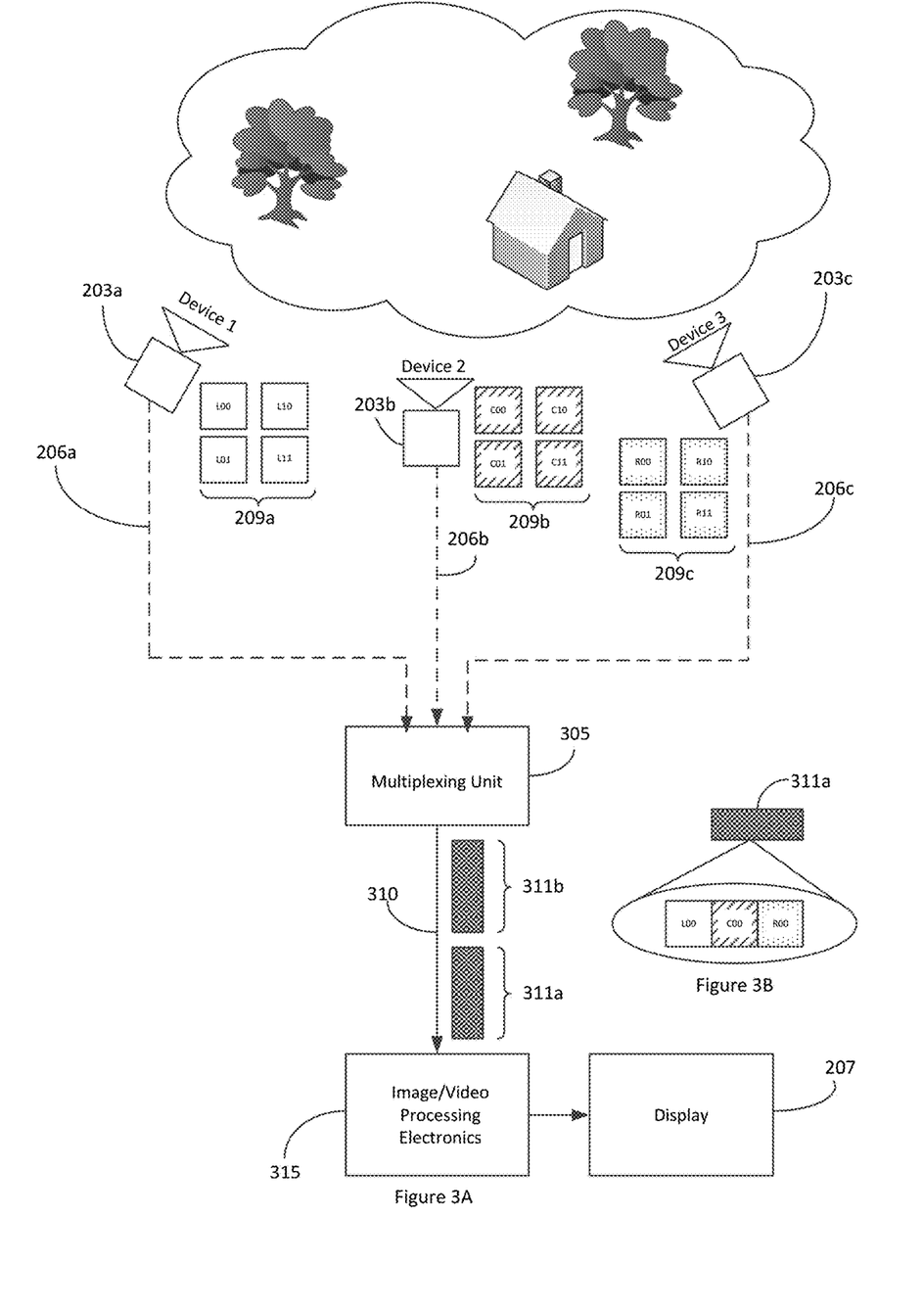
FIG. 3B illustrates an example of a multiplexed pixel structure.

FIG. 3 schematically depicts an imaging system comprising a multiplexing unit or multiplexing electronics 305 that is configured to multiplex image data from the plurality of monochrome imaging devices or cameras 203a, 203b, and 203c and transmit the multiplexed data to the image/video processing electronics 315 via a single cable/transmission line 310. The single cable/transmission line can be similar to the cable/transmission line that is configured to transmit red, green and blue image data from a sensor array (e.g., sensor array depicted in FIG. 1 such as an RGB sensor array) of a color camera. The imaging system of FIG. 3 can be used to generate time synchronized images from the images acquired by the monochrome imaging devices/cameras 203a, 203b, and 203c that can be displayed on display devices. These display devices may include in some cases respective displays positioned in front of left and right eyes of humans such as for example mounted on helmet so as to be positioned in front of the wearer's eyes. The imaging system of FIG. 3, for example, can be used to generate time coherent left and right eye images from three sub images acquired by the imaging devices (e.g., three cameras) to be presented on the left and right displays disposed in front of the respective left and right eyes.

The three imaging devices or cameras 203a, 203b, and 203c can be configured to obtain images of the scene 201 at approximately the same point in time. This can be accomplished by providing a signal (e.g., a gen lock signal) to the three imaging devices or cameras 203a, 203b, and 203c. The image data from the different imaging devices 203a-203c can be multiplexed by the multiplexing unit or multiplexing electronics 305 before being transmitted to the image/video processing electronics 315 via the single cable/transmission line 310. An example of a multiplexing scheme comprises generating a multiplexed pixel comprising information from co-located pixels in the image data acquired by the three imaging devices. For example, multiplexed pixel 311a comprises information from the pixel L00 of the sensor or detector array 209a, pixel C00 of the sensor or detector array 209a, and pixel R00 of the sensor or detector array 209c. The multiplexed pixel 311b comprises information from the pixel L10 of the sensor or detector array 209a, pixel C10 of the sensor or detector array 209a, and pixel R10 of the sensor or detector array 209c. In this manner, information from the sensor or detector arrays 209a, 209b and 209c is time synchronized at the pixel level.

The multiplexed pixels 311a and 311b can comprise N bytes with each byte comprising an M bit field. Thus, multiplexed pixels 311a and 311b comprise N×M bits. If each bit corresponds to the time interval between two consecutive clock signals, then the multiplexed pixels 311a and 311b occupy a time slot that is N×M the time interval between two consecutive clock signals.

In some implementations, the multiplexed pixels 311a and 311b can comprise 4 bytes, with each byte comprising a 10 bit field and the clock frequency can be about 5.21 GHz. In such implementations, each multiplexed pixel 311a can occupy a time slot that is about 7.7 ns long.

In various implementations, N can have a value greater than or equal to 2 and less than or equal to 64. For example, N can have a value of 2, 3, 6, 8, 10, 12, 16, 24, 32, or 64 or any value in the range or sub-range defined by these values. In various implementations, M can have a value greater than or equal to 2 and less than or equal to 64. For example, N can have a value of 2, 3, 6, 8, 10, 12, 16, 24, 32, or 64 or any value in the range or sub-range defined by these values. In various implementations, the clock frequency can have a value greater than or equal to about 100 MHz and less than or equal to about 40 GHz. For example, the clock frequency can be greater than or equal to 128 MHz and less than or equal to 32 GHz, greater than or equal to 256 MHz and less than or equal to 24 GHz, greater than or equal to 512 MHz and less than or equal to 20 GHz, greater than or equal to 1 GHz and less than or equal to 17.5 GHz, greater than or equal to 2.5 GHz and less than or equal to 12 GHz, greater than or equal to 5 GHz and less than or equal to 10 GHz, or any value in the range or sub-range defined by these values.

The multiplexing unit or electronics 305 can be configured to correct for or reduce any time variations and local clock variations between the imaging devices 203a, 203b, and 203c. The multiplexing unit may be further configured to encapsulate one or more of the multiplexed pixels 311a, 311b into a payload. Each payload can comprise headers and trailers that can provide additional information, such as, for example, start of the payload, end of the payload, and/or any other information that may be useful for additional coding/decoding functions. A payload may comprise, for example, a line of an image. The multiplexing unit or electronics 305 may comprise, for example, a Field Programmable Gate Array (FPGA), in some cases.

The multiplexed payload may be transmitted via the transmission line 310 from the multiplexing electronics 305 to the image processing or video processing electronics 315 and processed and transmitted to one or more displays or other devices. The image/video processing electronics 315 depicted in FIG. 3A can be configured to demultiplex the multiplexed payload to extract the individual data streams from the imaging devices 203a, 203b, and 203c. Since the individual data streams were temporally synchronized by the multiplexing unit, the temporal relationship between the individual data streams can be maintained while demultiplexing. In some embodiments, for example, multiplex image data may be processed by the image/video processing electronics 315 to drive one or more displays. As discussed above, the displays may comprise left and right displays for respective left and right eyes of the viewer. The displays may, for example, be mounted on helmets and provide views of images obtained by the plurality of cameras and respective image sensors which may obtain image of a scene from different perspectives. These cameras may be, for example, mounted on the helmet. In some cases, images or portions of images from different cameras may be stitched together. For example, images from different cameras can be stitched together to provide a wider field of view. In some cases, such cameras may be night vision cameras that operate using low levels of ambient light. These cameras may include, for example, central, left and right cameras such as shown in FIG. 3. The number, arrangement and/or configuration of the cameras may be different. For example, although the left and right cameras are shown as directed inward, the left and right cameras could be directed outward away from each other. Also, more or less cameras may be used.

Other variations are also possible. For example, the number cameras and/or pixels in each sensor array may be different from that shown in the figures or in the specific examples provided herein. The multiplexing formats may also be different than the examples provided. Variations among features are also possible.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An imaging system comprising:
    a plurality of cameras comprising a plurality of optical sensor arrays, different sensor arrays of the plurality of optical sensor arrays configured to obtain a monochrome image of a scene and produce image data,
    a multiplexing unit configured to multiplex image data obtained by different sensor arrays of the plurality of optical sensor arrays and generate a single image stream; and
    a transmission line configured to accept the generated single image stream,
    wherein the plurality of optical sensor arrays comprises three optical sensor arrays, the three optical sensor arrays comprising respective arrays of pixels, a pixel in the array of pixels associated with a unique set of coordinates designating the position of the pixel in the array of pixels, and
    wherein the single image stream comprises a plurality of multiplexed pixels comprising information from co-located pixels of the three optical sensor arrays, the information from the co-located pixels of the three optical sensor arrays being time synchronized.

2. The imaging system of claim 1, wherein the transmission line is configured to accept image data obtained by an RGB color camera comprising a pixel array comprising red, green, and blue sub-pixels configured to detect light in red, green and blue wavelengths, respectively, of the visible spectral range.

3. The imaging system of claim 1, wherein the multiplexing unit is configured to time division multiplex image data obtained by the three optical sensor arrays as a single serial image stream.

4. The imaging system of claim 1, further comprising an image processing unit in communication with said transmission line configured to receive said image stream comprising multiplex image data obtained by different sensor arrays of the plurality of optical sensor arrays.

5. The imaging system of claim 4, wherein said image processing unit is configured to generate time synchronized images from the images acquired by the plurality of cameras that can be displayed on one or more display devices.

6. The imaging system of claim 1, wherein the plurality of optical sensor arrays comprise monochrome sensor arrays.

7. The imaging system of claim 1, wherein the plurality of optical sensor arrays comprise sensor arrays sensitive to light in a wavelength range between about 360 nm and about 12 microns.

8. The imaging system of claim 1, wherein the plurality of optical sensor arrays comprise infrared sensor arrays sensitive to infrared light.

9. The imaging system of claim 1, wherein the plurality of cameras comprise night vision cameras.

10. The imaging system of claim 1, wherein said plurality of cameras further comprise lenses configured to image the scene.

11. The imaging system of claim 1, wherein the plurality of cameras have different fields of view.

12. The imaging system of claim 1, disposed in an aircraft.

13. The imaging system of claim 1, disposed in a ship or boat.

14. The imaging system of claim 1, disposed in terrestrial vehicle.

15. The imaging system of claim 1, disposed on a helmet configured to be worn on the head of a wearer.

16. The imaging system of claim 15, further comprising an image processing unit configured to generate time synchronized images from the images acquired by the plurality of cameras that can be displayed on one or more display devices disposed in front of the wearer's left and right eyes.

17. The imaging system of claim 15, wherein said display devices are disposed on said helmet.

18. The imaging system of claim 15, wherein said cameras are disposed on said helmet.

19. The imaging system of claim 1, wherein said transmission line comprises coaxial cable.

20. The imaging system of claim 1, wherein said transmission line comprises a balanced pair.

21. An imaging system comprising:
    a plurality of cameras comprising a plurality of optical sensor arrays, different sensor arrays of the plurality of optical sensor arrays configured to obtain a monochrome image of a scene and produce image data,
    a multiplexing unit configured to multiplex image data obtained by different sensor arrays of the plurality of optical sensor arrays and generate a single image stream comprising a plurality of multiplexed pixels; and
    a transmission line configured to accept the generated single image stream,
    wherein different sensor arrays of the plurality of optical sensor arrays comprise respective arrays of pixels, a pixel in the array of pixels associated with a unique set of coordinates designating the position of the pixel in the array of pixels, and wherein a multiplexed pixel from the plurality of multiplexed pixels comprises information from co-located pixels of different sensor arrays, the information from the co-located pixels of different sensor arrays sensor arrays being time synchronized.

22. The imaging system of claim 21, wherein the transmission line is configured to accept image data obtained by an RGB color camera comprising a pixel array comprising red, green, and blue sub-pixels configured to detect light in red, green and blue wavelengths, respectively, of the visible spectral range.

23. The imaging system of claim 21, further comprising an image processing unit in communication with said transmission line configured to receive said image stream comprising multiplex image data obtained by different sensor arrays of the plurality of optical sensor arrays.

24. The imaging system of claim 23, wherein said image processing unit is configured to generate time synchronized images from the images acquired by the plurality of cameras that can be displayed on one or more display devices.

25. The imaging system of claim 21, wherein the plurality of optical sensor arrays comprise monochrome sensor arrays.

* * * * *